United States Patent [19]

Vandervoort et al.

[11] Patent Number: 4,648,822
[45] Date of Patent: Mar. 10, 1987

[54] APPARATUS FOR AUTOMATICALLY SUBDIVIDING DOUGH IN A SINGLE USE, NONMETALLIC TRAY

[75] Inventors: David Vandervoort, Orange; Monty Griffith, Fullerton, both of Calif.

[73] Assignee: Bridgford Foods Corporation, Anaheim, Calif.

[21] Appl. No.: 742,746

[22] Filed: Jun. 10, 1985

[51] Int. Cl.⁴ .............................................. B29C 47/92
[52] U.S. Cl. ................................... 425/135; 425/142; 425/150; 425/163; 425/306
[58] Field of Search ............... 425/238, 157, 158, 163, 425/306, 135, 136, 142, 150

[56] References Cited

U.S. PATENT DOCUMENTS

| | | | |
|---|---|---|---|
| 1,826,031 | 10/1931 | Streich | 425/238 |
| 2,781,732 | 2/1957 | Lenherr | 425/96 |
| 2,884,694 | 5/1959 | Hannon et al. | 425/163 |
| 3,179,069 | 4/1965 | Bartholomew | 425/238 |
| 3,596,613 | 8/1971 | Roth et al. | 425/300 |
| 4,075,359 | 2/1978 | Thulin | 425/89 |
| 4,123,213 | 10/1978 | Laramore | 425/104 |

Primary Examiner—Jan Silbaugh
Assistant Examiner—Jennifer Cabaniss
Attorney, Agent, or Firm—Sellers & Brace

[57] ABSTRACT

Disclosed is a pneumatically powered automatic apparatus and method for subdividing one or more loaves of dough supported in a partitioned single use, nonmetallic tray at a processing station intermediate the opposite ends of a conveyor. A tray of dough is introduced into the apparatus as a tray of subdivided dough exits onto the conveyor. The dough divider functions to draw the skin of the roll of dough from the upper and lower sides thereof permanently into closely spaced relation between adjacent subdivisions of dough thereby leaving the subdivisions connected solely by a web which is readily frangible when the dough is baked. The dough subdivider operates dry and free of lubricant. Trays of dough exiting from the apparatus are maintained frozen and wrapped until ready for the oven at either a local or a distant consumption site.

29 Claims, 16 Drawing Figures

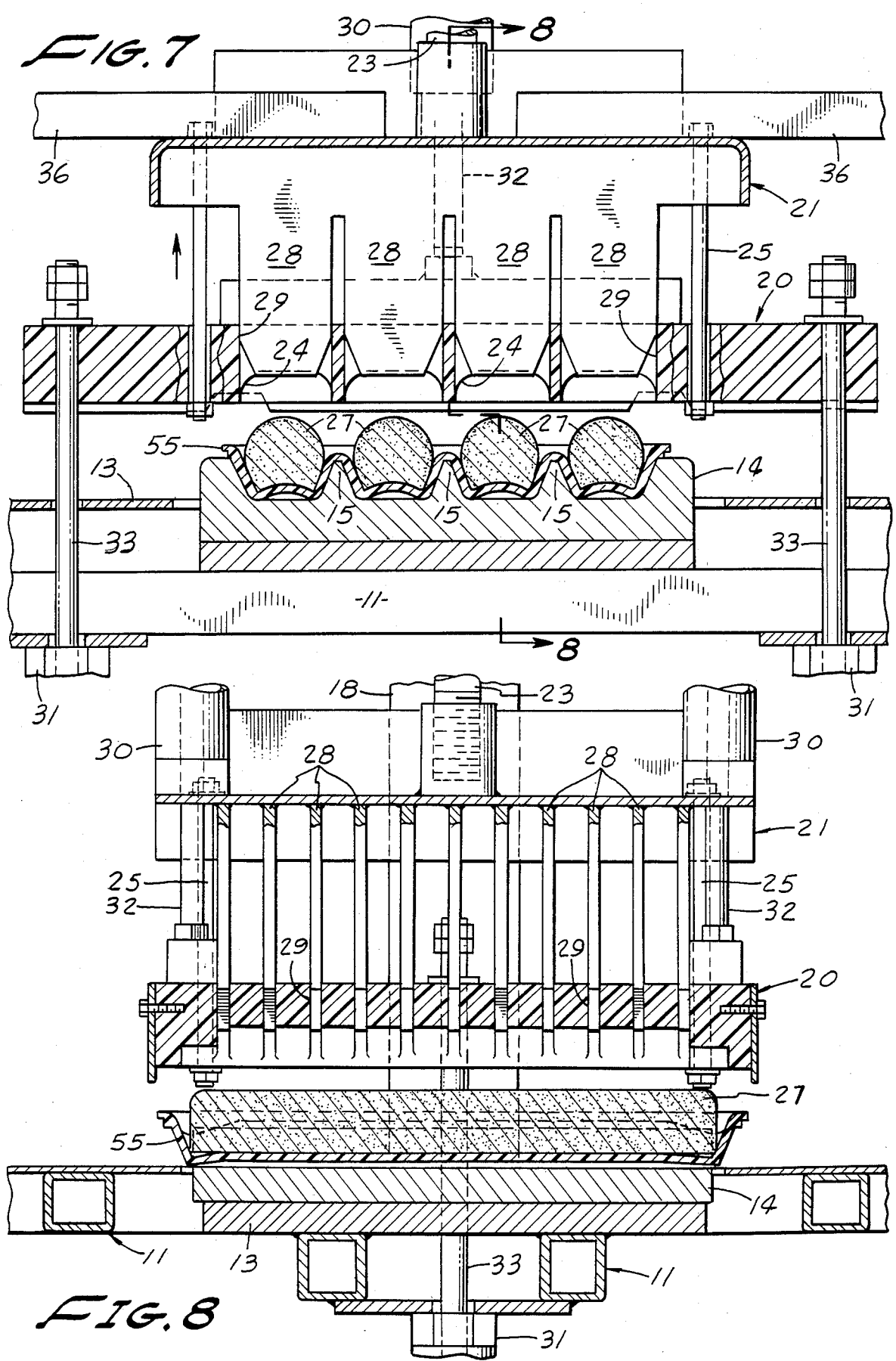

APPARATUS FOR AUTOMATICALLY SUBDIVIDING DOUGH IN A SINGLE USE, NONMETALLIC TRAY

This invention relates to bread dough processing apparatus, and more particularly to a unique apparatus and method for automatically subdividing elongated loaves of dough while supported in a nonmetallic, single use tray for packaging and storing frozen until ready for baking and consumption.

BACKGROUND OF THE INVENTION

Present day bakery technology provides equipment for processing large quantities of ingredients into dough which can be preserved for prolonged periods by freezing. Various proposals have been made for processing such dough in industrial facilities suitable for transportation and distribution to sales outlets in frozen condition. Among the techniques in use is the packaging of frozen unbaked dough in cardboard cartons. The purchaser removes the dough from the carton, subdivides it and then bakes it. Another technique involves rolling out the dough in a thick pad which is subdivided into biscuit-size units, frozen and packaged loosely in a bag and maintained frozen until ready for baking.

Still other techniques are disclosed in the U.S. Pat. Nos. to Nameth 934,749; Gathmann 1,735,111; Cederholm et al. 2,054,720 and Schmittroth 2,618,227. Each of these patents discloses a manual dough cutter, some of which have provision for cutting the dough while present in a metal baking tray. Oertel U.S. Pat. No. 1,629,295 proposes a hand-held dough cutter. Guldbech U.S. Pat. No. 2,234,525 proposes an apparatus for forming twist dough, and Hannon et al. U.S. Pat. No. 2,884,694 discloses a pneumatically powered hand-controlled cheese press and subdivider.

Cederhold et al. discovered that blades for subdividing bread dough are subject to problems owing to the strong tendency of dough to adhere to the subdividing knives during their withdrawal with obvious serious disadvantages. To alleviate these problems he suggests operating the subdividing knives through fluid-sealed slots in the bottom of a tray flooded with an edible lubricating oil. This introduces sanitation, maintenance and servicing problems.

SUMMARY OF THE INVENTION

This invention provides a substantially fully automatic apparatus and method for the mass production of unbaked dough packaged in inexpensive, single use, nonmetallic trays subdivided into suitable rows of dough interconnected solely by a weak web of dough skin which is readily frangible into separate rolls before or after baking. Elongated rolls of the dough are supported in side-by-side partitioned single use trays and are advanced on a conveyor into the pneumatically powered automatic subdividing apparatus which returns the processed trays to the downstream side of the conveyor. While in the apparatus, the dough is subdivided by a set of virtually friction-free, non-lubricated divider blades which operate to bring the upper and lower sides of the dough skin into virtual contact with one another. Trays of subdivided dough are snugly wrapped in suitable film material and maintained frozen during storage and distribution to the final point of consumption. At that time the trays are unwrapped, the dough may be readily separated into individual rolls by breaking the fragile connecting web between adjacent rolls.

In view of the foregoing, it is a primary object of this invention to provide a greatly simplified automatic apparatus and method for processing edible dough.

Another object of the invention is the provision of pneumatically powered automatic apparatus and a method of subdividing dough supported in a single use, throwaway tray.

Another object of the invention is the provision of apparatus for subdividing dough into a plurality of units weakly interconnected by a thin web of dough.

Another object of the invention is the provision of a method for processing dough supported in subdivided single use trays and transported past a dough subdividing station followed by freezing and wrapping the individual trays of dough for storage and distribution to the ultimate consumer in frozen condition.

Another object of the invention is the provision of an improved method of packaging dough in a single use tray filled with a plurality of dough elements adjacent ones of which are interconnected by a thin web of dough which is readily frangible after baking.

Another object of the invention is the provision of an automatic pneumatic control system for apparatus operable to subdivide rolls of dough into a plurality of roll-size dough in an open top shipping container.

These and other more specific objects will appear upon reading the following specification and claims and upon considering in connection therewith the attached drawing to which they relate.

Referring now to the drawing in which a preferred embodiment of the invention is illustrated:

FIG. 7 is a cross-sectional view taken along line 7—7 on FIG. 2;

FIG. 8 is a fragmentary cross-sectional view taken along line 8—8 on FIG. 7;

Figure 1:
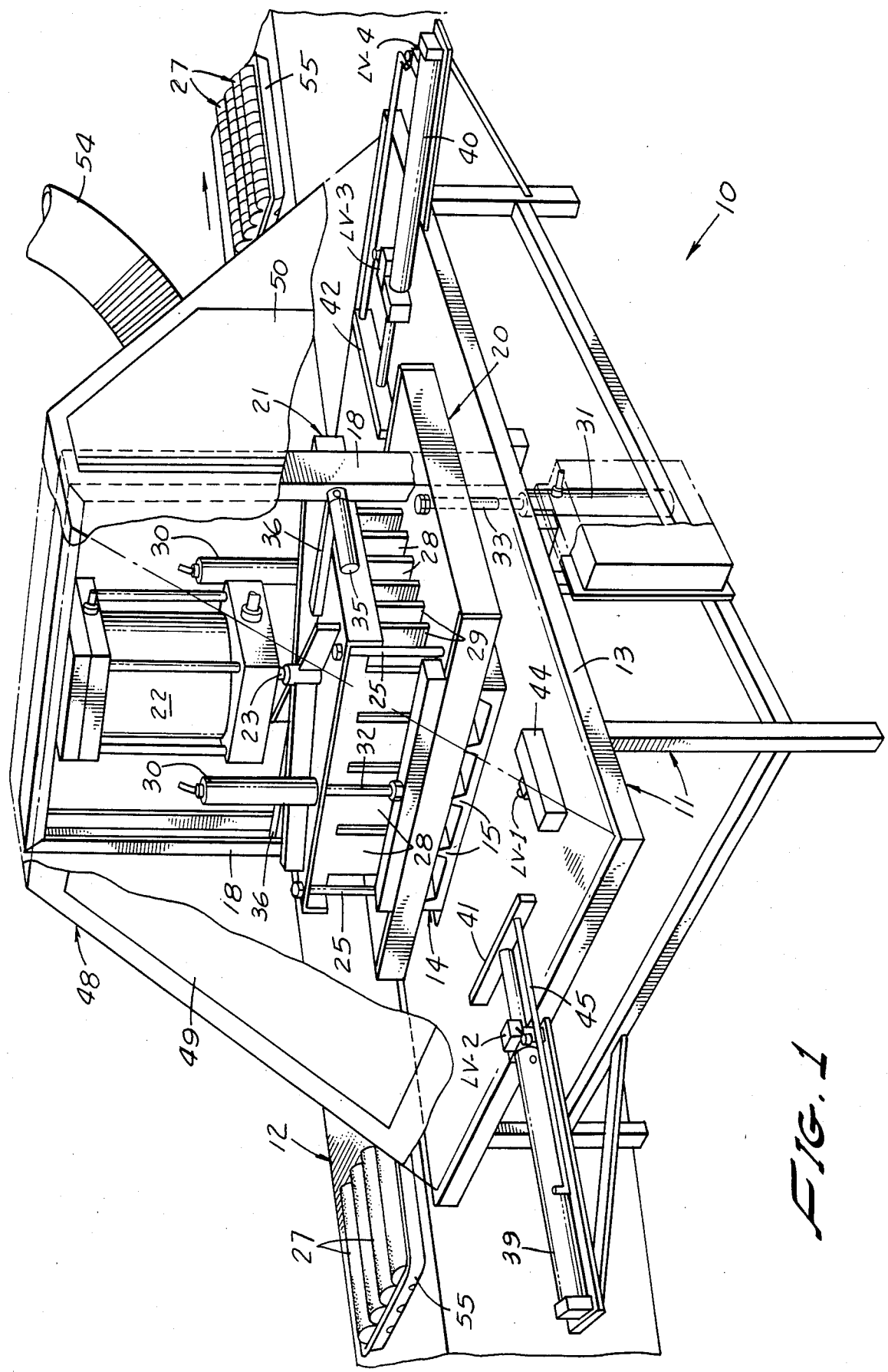
FIG. 1 is a perspective view showing an illustrative embodiment of the invention apparatus with portions of the hood broken away to show structural details.
Figure 2:
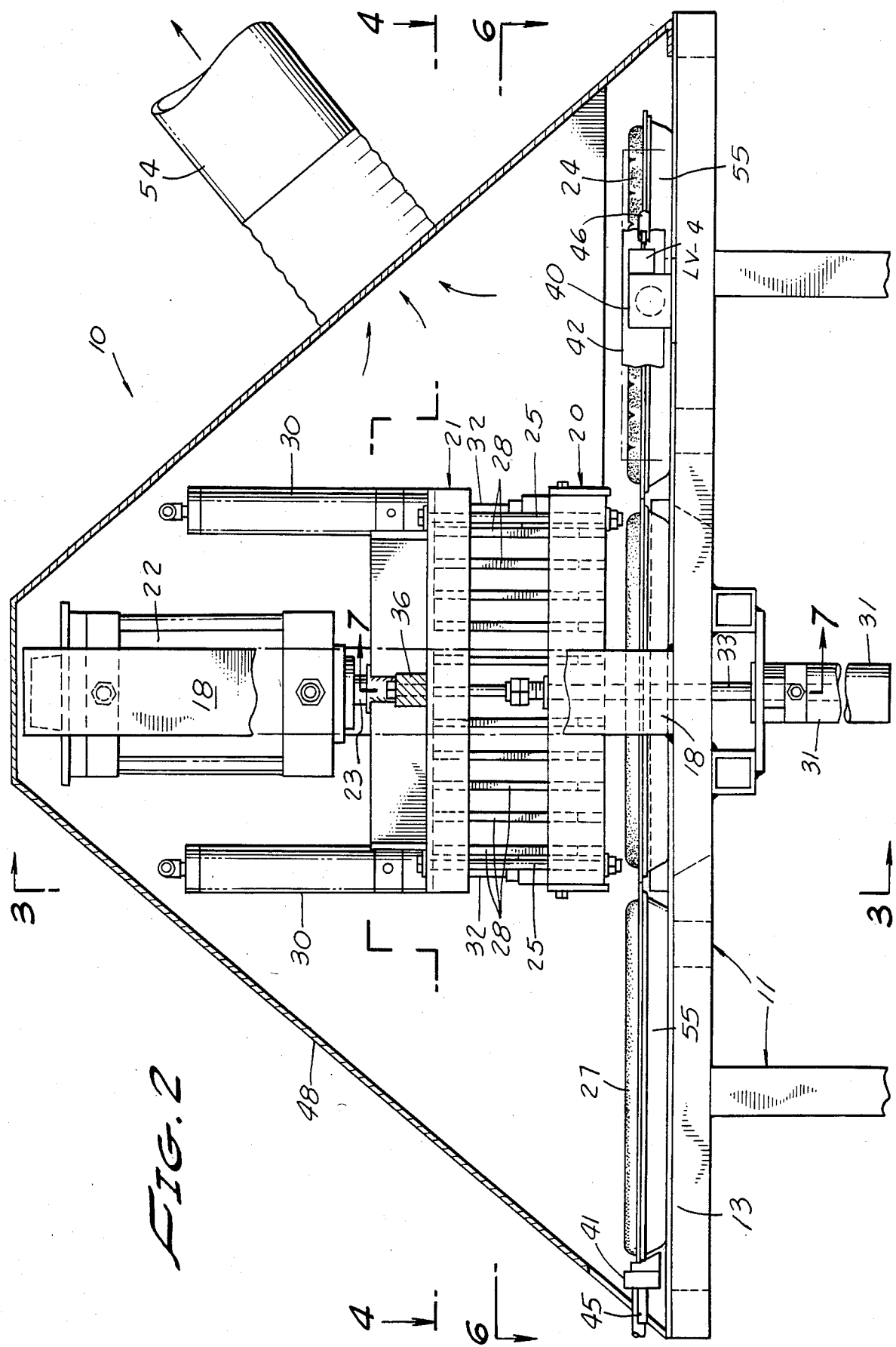
FIG. 2 is an elevational view from the right-hand side of FIG. 1 with portions broken away to illustrate structural details.

Referring initially to FIG. 1, there is shown an illustrative embodiment of the invention dough subdividing apparatus, designated generally 10, having a main frame 11 mounted beside a conveyor 12. This conveyor moves rightward as is indicated by the arrow and serves to convey trays charged with one or more loaves of dough to the subdividing apparatus and other trays of subdivided dough away therefrom. The main frame has a table top 13 supporting a platen 14, provided with upstanding parallel ribs 15 which register snugly with channels extending lengthwise of the dough trays as will be described more fully presently and serve to hold the tray accurately centered beneath the dough subdividing blades.

Rigidly anchored to table 13 is an inverted U-shaped frame 18 formed of channel members which serve as a guide and support for the components of the dough subdividing subassemblies. These subassemblies include a dough stripper 20, a dough subdividing blade assembly 21 and a main operating cylinder 22 extending vertically between the top of the dough subdivider 21 and the right portion of frame 18. Dough stripper 20 is preferably formed of suitable low friction material such as ultra high molecular weight polyethylene plastic known commercially as UHMW-PE. The dough stripper 20 is rigidly secured to the lower end of the piston rod 23 of cylinder 22. The dough stripper 20 is loosely and slidably suspended from the dough divider 21 by a plurality of bolts 25 loosely interconnecting at the four corners of assemblies 20 and 21 and passing loosely through holes in stripper 20. The dough subdivider is equipped with a plurality of parallel dough subdivider blades 28 reciprocal vertically through a series of slots 29 extending through stripper 20 and are preferably formed of a material such as polished stainless steel having a low surface coefficient of friction.

Figure 3:
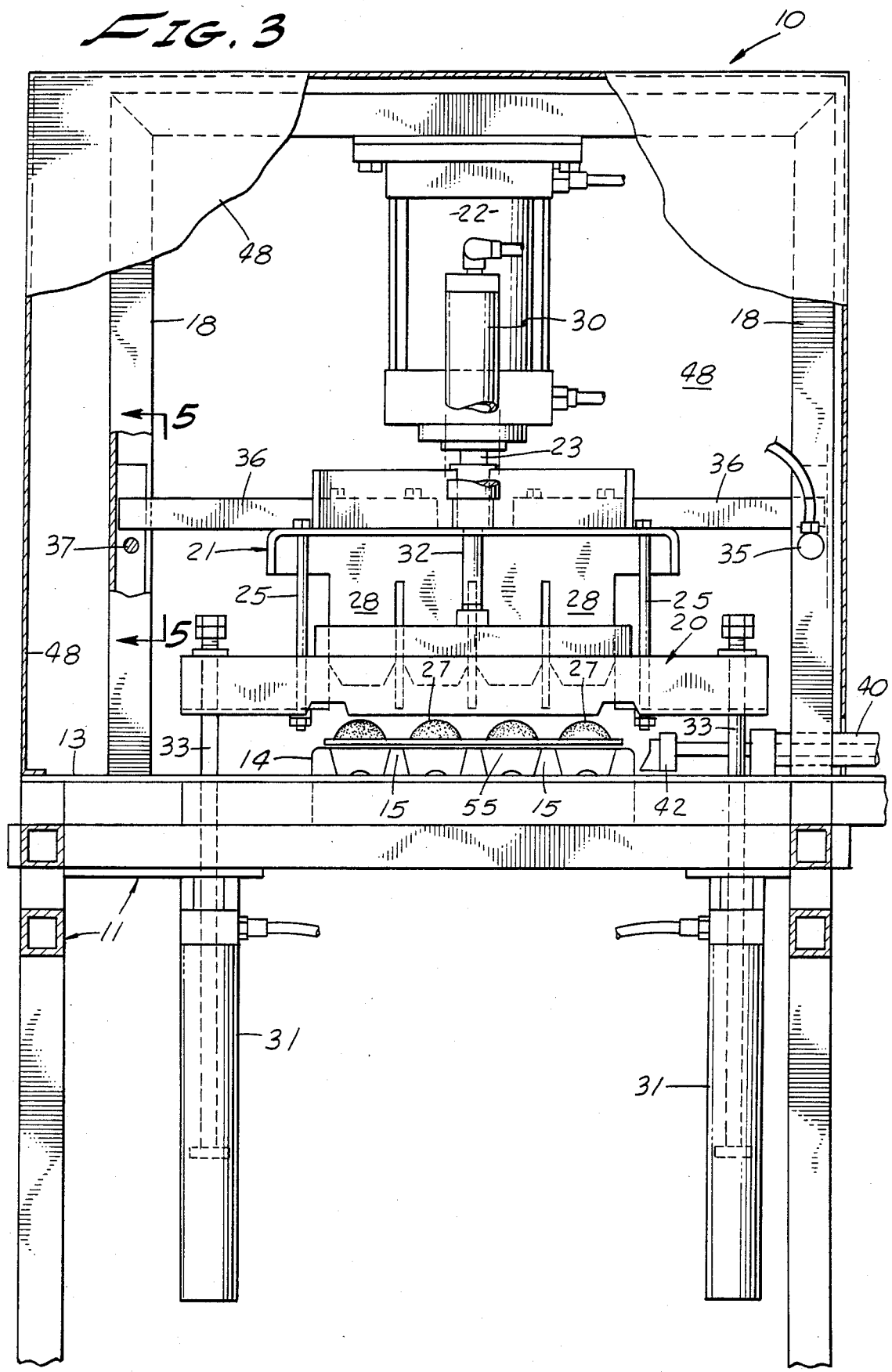
FIG. 3 is a cross-sectional view taken along line 3—3 on FIG. 2 showing the cutting blades and the stripper assembly partially lowered.

As shown in FIGS. 1 and 3, stripper 20 and subdivider 21 are held in their fully retracted position by the main power cylinder 22. However, both stripper 20 and subdivider 21 are vertically movable independent of one another to a degree. For this purpose a first pair of cylinders 30 are supported in an upright position along the opposite sides of subdivider 21 and a second pair of cylinders 31 are rigidly connected to main frame 11 and extend vertically beneath the table top 13. The piston rods 32 of the upper pair of cylinders 30 are anchored to the opposite sides of stripper assembly 20, whereas the piston rods 33 of cylinders 31 are rigidly secured to the opposite ends of stripper 20. The two pairs of cylinders 30, 31 and the main cylinder 22 operate in programmed sequence, as will be explained in detail in connection with the operation of the automatic control schematic illustrated in FIG. 16.

A second pair of safety or lockout cylinders 35 (FIG. 1) are rigidly secured horizontally to the vertical legs of the U-shaped frame 18. Each of these cylinders includes a piston spring-biased to project the outer end of the piston rod 37 through a pair of aligned openings through the flanges of the channel-shaped frame members 18. In the absence of pressurized air present in the pneumatic control system, the spring in each pressurized cylinder extends the piston so that the piston rods 37 project through the openings in frame 18 in an area underlying the arms 36 projecting from the opposite sides of subdivider assembly 21. So long as air pressure is connected to the system, the pistons of the safety cylinders 35 are retracted out of the path of arms 36 rigidly anchored to the opposite sides of the subdivider 21. When the subdivider 21 is retracted as it normally is, the ends of arms 36 are located in a plane above the piston rods of cylinders 35.

Accordingly, if there should be a power failure, when stripper 20 and subdivider 21 are elevated, the springs in the safety cylinders 35 will extend their respective piston rods crosswise of the channel members 18 and beneath the outer ends of arms 36 thereby preventing either of the subassemblies 20 or 21 from falling and posing a threat of injury to the equipment or to personnel.

Table top 13 is also provided with another pair of cylinders 39 and 40 (FIG. 1) equipped with pushers 41, 42 on the outer ends of their piston rods. Pusher 41 is operable to shift a tray of incoming dough to the right immediately following the manual positioning of a tray into contact with a sensor or limit switch LV-1 mounted on a stop 44 secured to table top 13. When the tray actuates this switch, the channels on the underside of the tray are in alignment with a respective one of the ribs 15 on platen 14. Accordingly, the extension of pusher 41 initiated by the contact of the tray with limit switch LV-1 shifts the tray accurately into position beneath the blades 28 of the subdivider 21. The entry of a new tray onto the platen also acts to discharge a previously processed tray off the platen into the path of the pusher 42 of cylinder 40. That cylinder then operates automatically, as will be described in connection with the control system, to shift the discharging tray of dough back onto conveyor 12.

The trays of dough to be subdivided are normally covered with a film of powder, such as flour, portions of which may escape or become dislodged during cycling of the apparatus. This very fine powder, if released into the surrounding environment can pose an explosion hazard. To safeguard against this potential threat as well as to assure completely sanitary conditions, the apparatus is preferably enclosed in a hood 48 which is desirably equipped with service access doors 49, 50, each equipped with safety sensors or limit switches LV-5 and LV-6 (FIG. 16) operable as will be described to deactivate operation of the entire apparatus unless all of the service access doors are in closed position.

OPERATION

Figure 16:
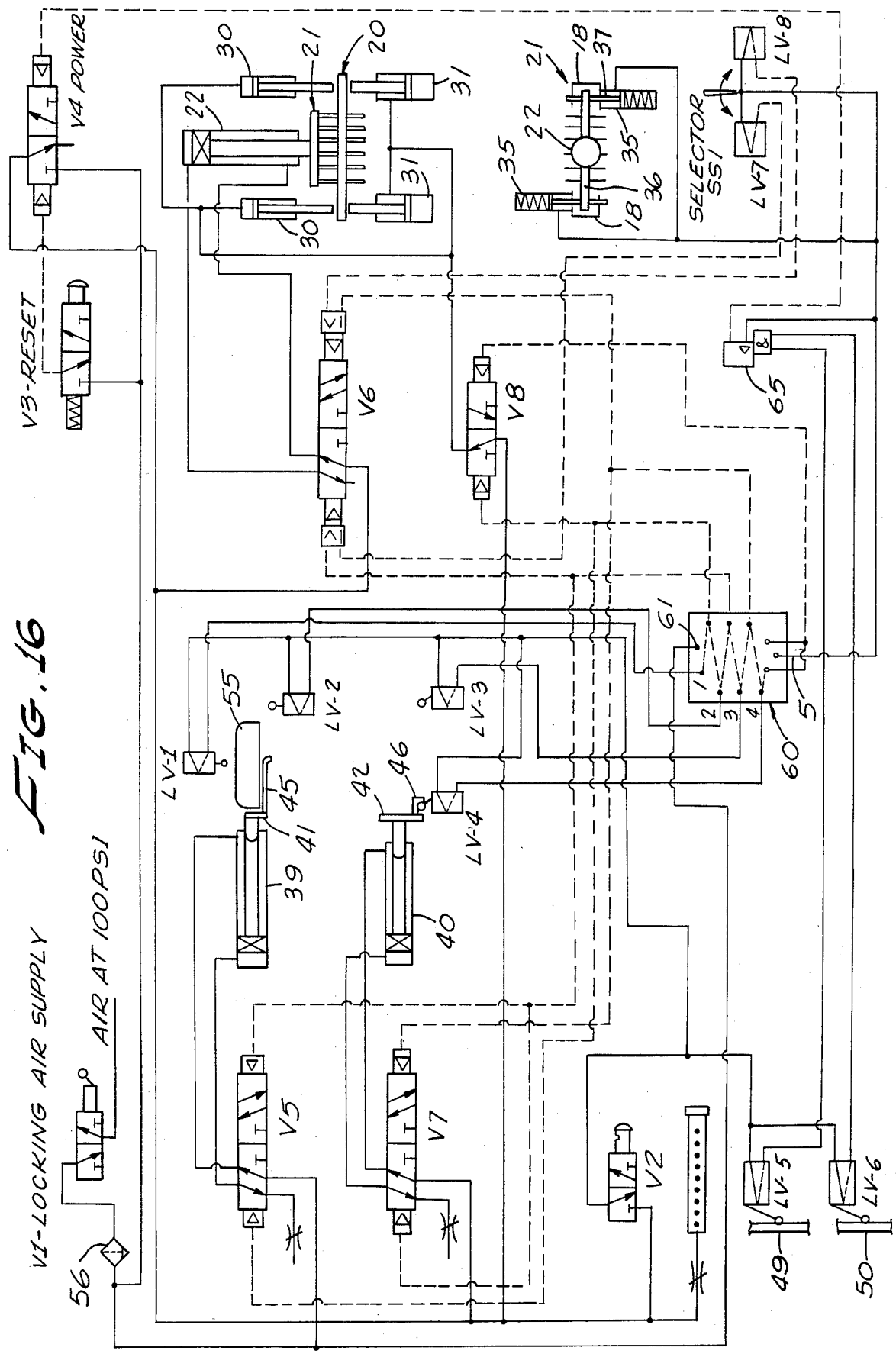
FIG. 16 is a schematic of the control circuitry for the dough subdividing apparatus.

The automatic pneumatic control system for apparatus 10 is illustrated in FIG. 16 and includes a diagramatic indication of principal components of the apparatus. As therein depicted, valve V1 controlling the supply of pressurized air is open, power valve V4 is in the open position so that the entire pneumatic system is vented to atmosphere, reset valve V3 is in open position, as is the manually operable valve V2. Also both the stripper 20 and the dough divider 21 are held retracted by the cylinder 22; and the safety locking cylinders 35 are in their extended position to lock subassemblies 20 and 21 in their respective retracted positions.

To initiate an operating cycle, the operator manually closes valve V1 supplying air through filter 56 to the manual reset valve V3 and to the arming port 61 at the top of an automatic programmer well-known to persons skilled in programmable pneumatic controllers such as that manufactured by Miller Fluid Power-Crouzet. Pressurized air so supplied to the controller 60 arms it for operation in response to signals as they are received from the pneumatic limit valves LV-1, LV-2, LV-3, LV-4, LV-5 and LV-6. It will be understood that the limit valves LV-5 and LV-6 are mounted on the hood 48 enclosing the dough processing components of the apparatus and in position for their respective actuating buttons to be shifted to the closed position when the hood service access doors 49 and 50 operatively associated with those doors are latched in their closed positions. As shown in FIG. 16, these doors are closed but the associated limit valves LV-5 and LV-6 are open since no pressurized air is then being supplied to the system. When the operator closes the main air supply valve V1, pressurized air is supplied to the arming port 61 of the automatic programmer 60. The operator then closes the detentequipped valve V2 which arms the six limit valves LV-1 through LV-6. If the service access doors 49 and 50 of the hood are closed, valves LV-5 and LV-6 close and transmit respective separate signals to the and/not device 65. Since port 61 of programmer 60 has been armed with pressurized air, pressurized air then present at outlet port 5 of the programmer is present in the top portion of and/not device 65. When an input signal is received from each of valves LV-5 and LV-6, device 65, now armed by pressurized air from outlet port 5 of programmer 60, transmits a control signal to power valve V4 shifting that valve leftward to its closed position. Pressurized air is now supplied to valves V5 and V6. Valve V5 is then positioned to supply air to hold the tray loading cylinder 39 in its retracted position by air supplied to its lower end from valve V6. The apparatus is now fully conditioned for starting a dough dividing cycle.

To initiate a dough subdividing cycle, the operator manually transfers a tray of dough 55 (FIG. 1) across the top of table 13 and into contact with limit switch LV-1. As the tray contacts and closes LV-1, this valve closes and transmits a signal to port 1 of the automatic programmer 60, which processes this signal to transmit an output signal to the pilot port at the left hand end of valve V5 shifting that valve leftward to supply pressurized air to piston 39. The piston of that cylinder then shifts tray 55 to a position directly below the dough subdivider 21. An L-shaped valve operating member 45 attached to pusher 41 (FIG. 1) closes limit switch LV-2 when the tray is properly positioned beneath the dough divider. When LV-2 closes, it transmits an operating air pulse to port 2 of programmer 60 which then transmits a signal to the pilot port at the right hand end of V5, thereby retracting the piston of the tray loading cylinder 39.

As an entering tray 55 reaches its fully loaded position, the actuating probe 45 (FIGS. 1 and 16) carried by the pusher 41 of loading cylinder 39 closes limit valve LV-2 and sends a signal to port 2 of programmer 60. The programmer then closes valve V5 thereby retracting the tray loading pusher and simultaneously opens valve V7 to supply air to the tray discharge cylinder 40. This cylinder then extends until probe 46 on its pusher 42 contacts and closes limit valve LV-3 as the processed tray 55 is transferred back onto conveyor 12. The momentary closing of LV-3 sends a signal to port 3 of the programmer.

Figure 4:
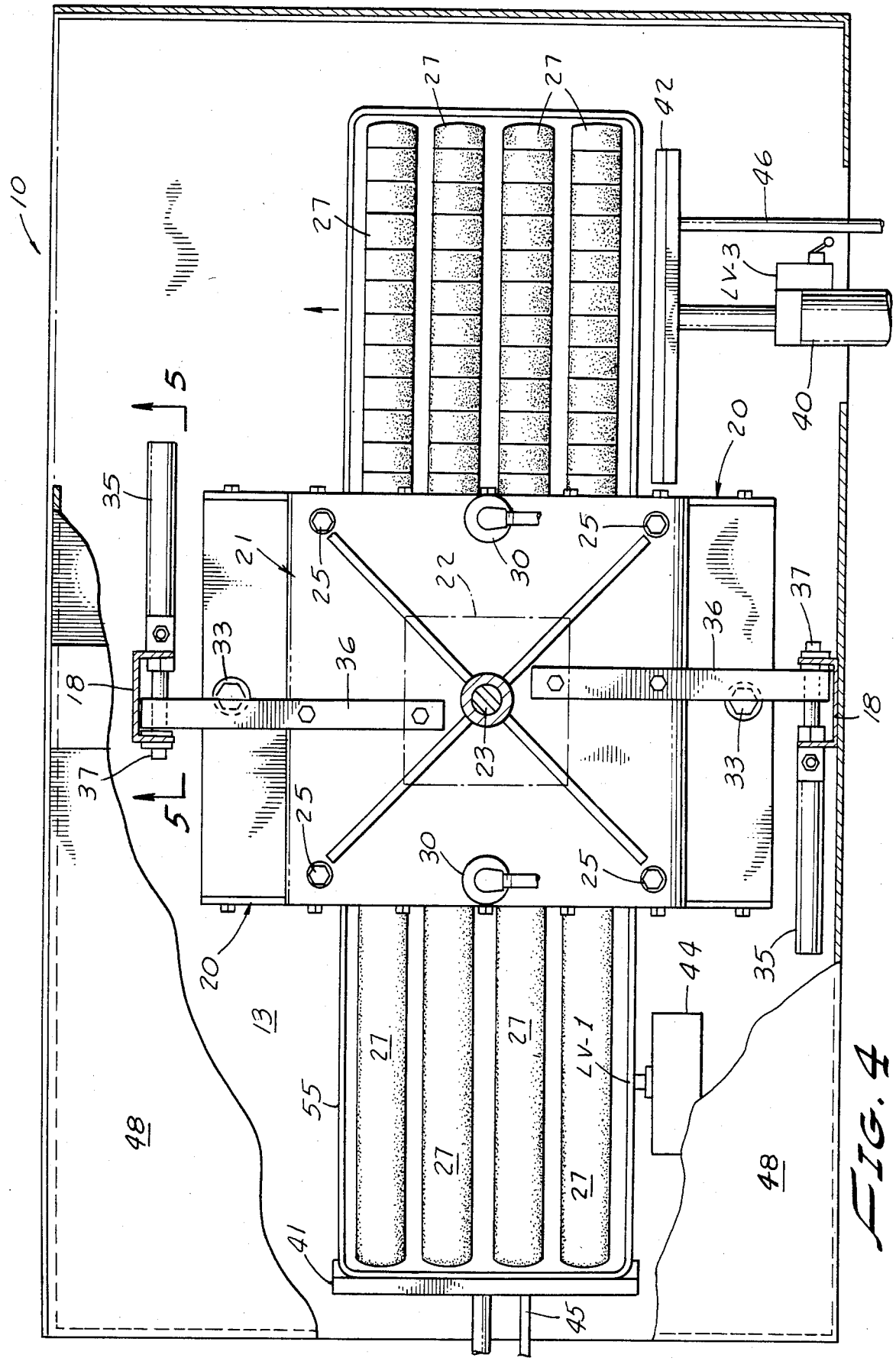
FIG. 4 is a cross-sectional view taken along the broken line 4—4 on FIG. 2.
Figure 5:
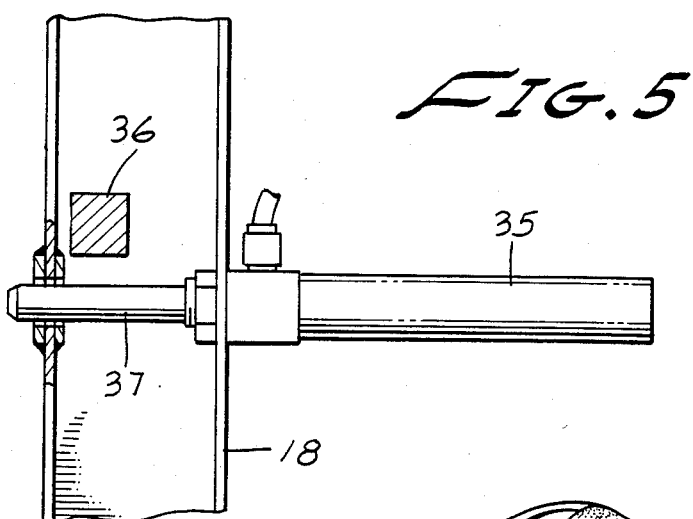
FIG. 5 is a cross-sectional view taken along line 5—5 on FIG. 4 showing details of the safety lockout feature.
Figure 13:
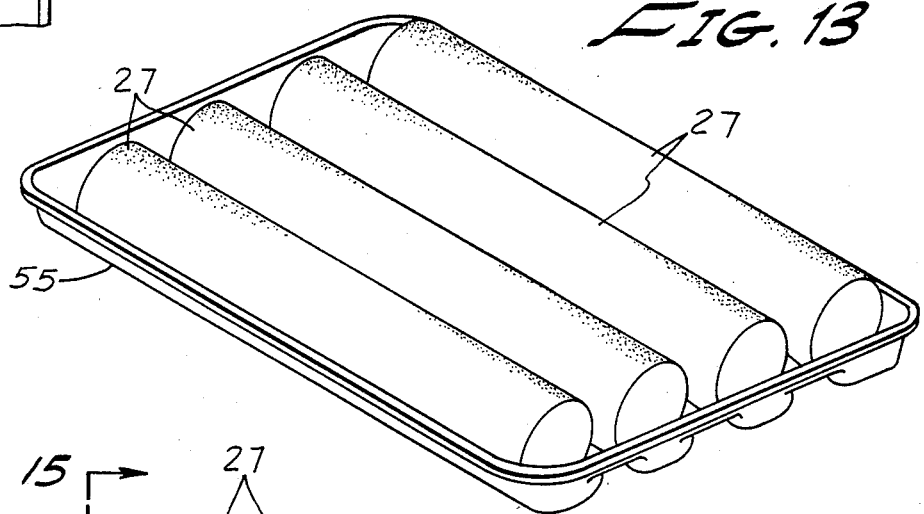
FIG. 13 is a perspective view of a typical single use tray loaded with loaves of dough ready to enter the dough subdividing apparatus.

While a tray of divided dough is being reloaded onto the conveyor, the operating signal received at port 2 of the programmer transmits a signal to the pilot at the left hand end of valve V6 shifting that valve leftward to supply pressurized air to the top of the dough processing cylinder 22. It will be understood that when the programmer was armed by the supply of pressurized air to its arming port 61, it functions to channel pressurized air to its outlet port 5 which then opens to supply air to the and/not device 65 as well as to the safety cylinders 35, thereby arming the and/not device 65 and also operating the safety lock cylinders 35, to retract their respective pistons and thereby restricting the rods 37 of each from beneath the overlying arms 36 projecting from the opposite sides of dough divider 21. It will be recalled that the piston rods 37 of cylinders 35 are held extended by the springs acting on their respective pistons when the pneumatic control system is not pressurized. Under these conditions the piston rods underlie the arms 36 extending laterally from the opposite sides of the dividing assembly 21 (FIG. 4). Accordingly when cylinders 35 are pressurized, the piston rods 37 are retracted so that assemblies 20 and 21 can be lowered to process the dough. When piston rods 37 are extended their ends project beyond the flange of the channel members 18 and are readily visible to inform personnel that the apparatus is cut-off from the air supply and that units 20 and 21 are latched in their retracted positions.

Figure 9:
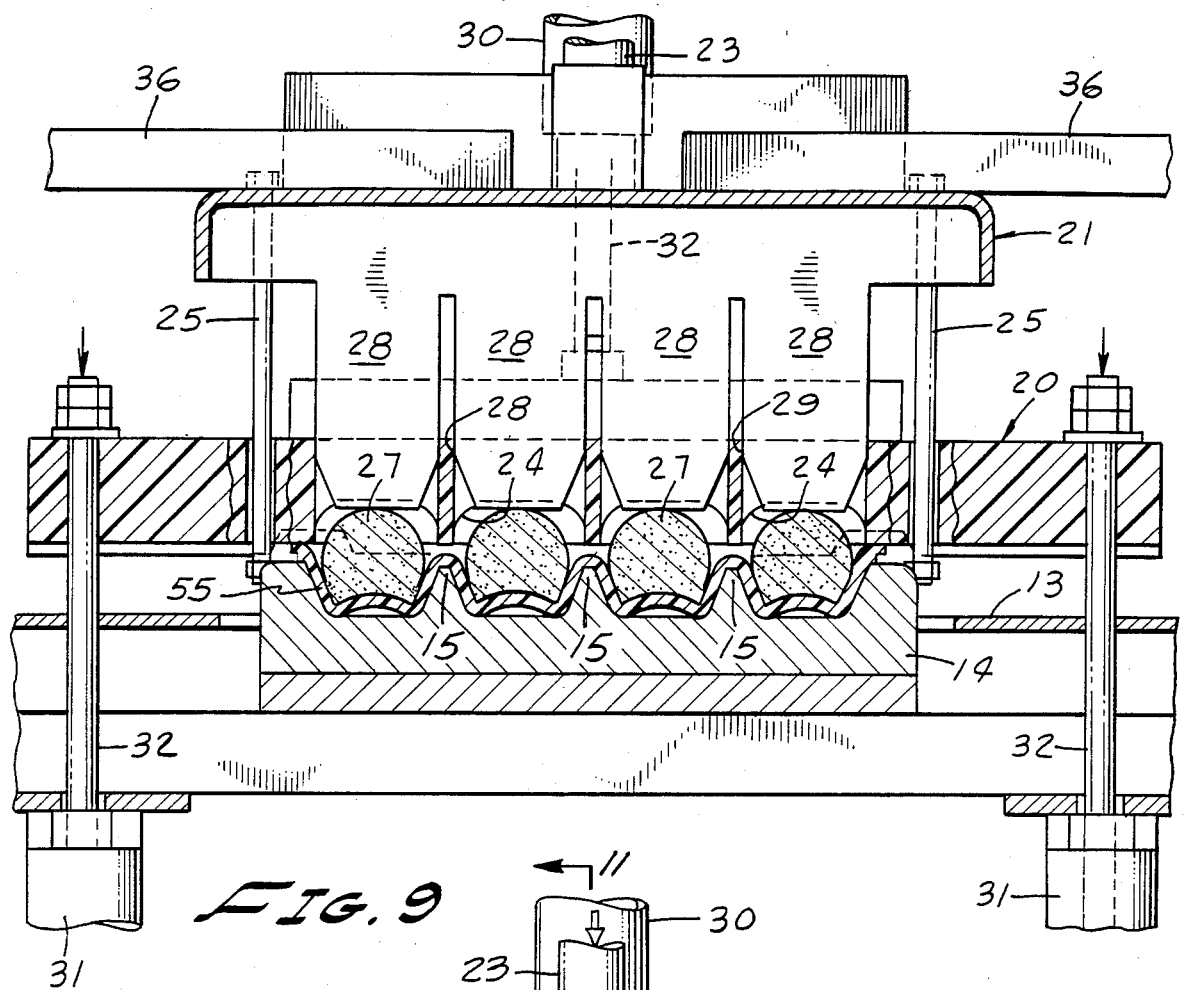
FIG. 9 is a cross-sectional view similar to FIG. 7, but showing the stripper subassembly fully extended and the knife subassembly partially extended.

As has been explained above, the piston rod of the master cylinder 22 is connected directly to the dividing assembly 21, the stripper assembly 20 being loosely suspended from divider 21 by bolts 25 (FIGS. 7 and 9). When limit valve LV-1 closed as a tray is being pushed onto the platen 14, the programmer sends a signal to the pilot port of valve V8 thereby supplying air to the stripper control cylinders 30 and 31. In consequence the pistons of cylinders 30 extend after an interval of time and push stripper 20 downwardly into contact with the rim of tray 15. As this operation is in progress, pressurized air flowing to cylinders 31 underlying stripper 20 acts to retract the pistons of these cylinders to permit the lowering of the stripper.

Figure 14:
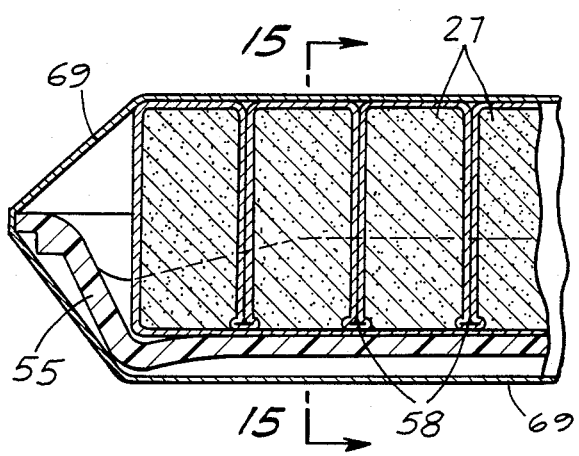
FIG. 14 is a fragmentary cross-sectional view of a tray of rolls after subdivision and enclosed in a wrapper.
Figure 15:
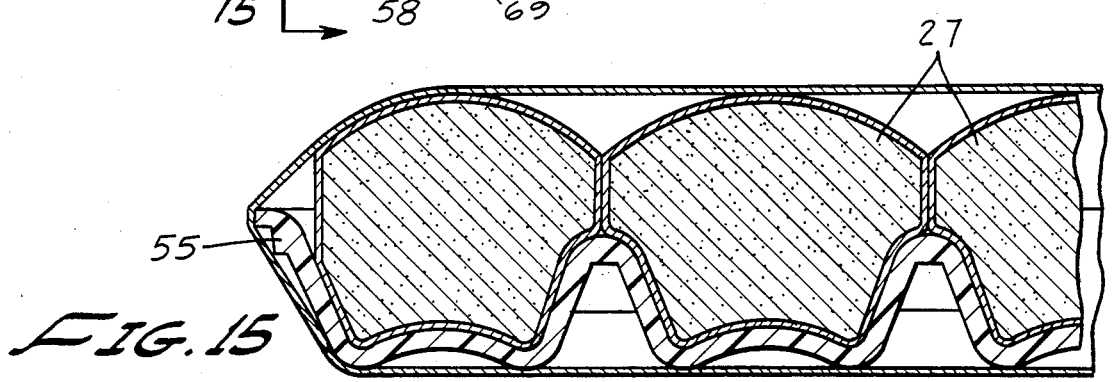
FIG. 15 is a cross-sectional view taken along line 15—15 on FIG. 14.
Figure 6:
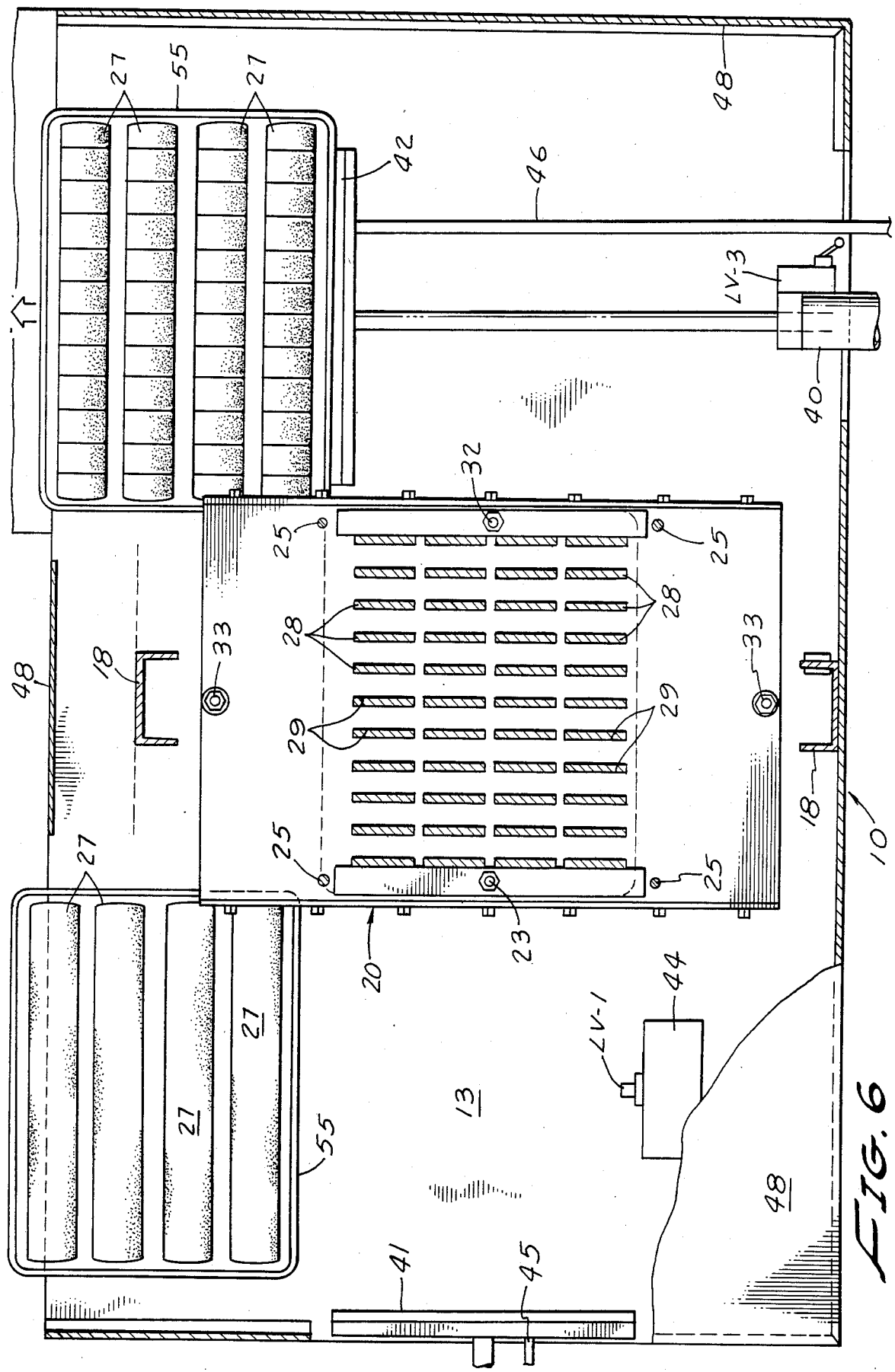
FIG. 6 is taken along line 6—6 on FIG. 2.
Figure 10:
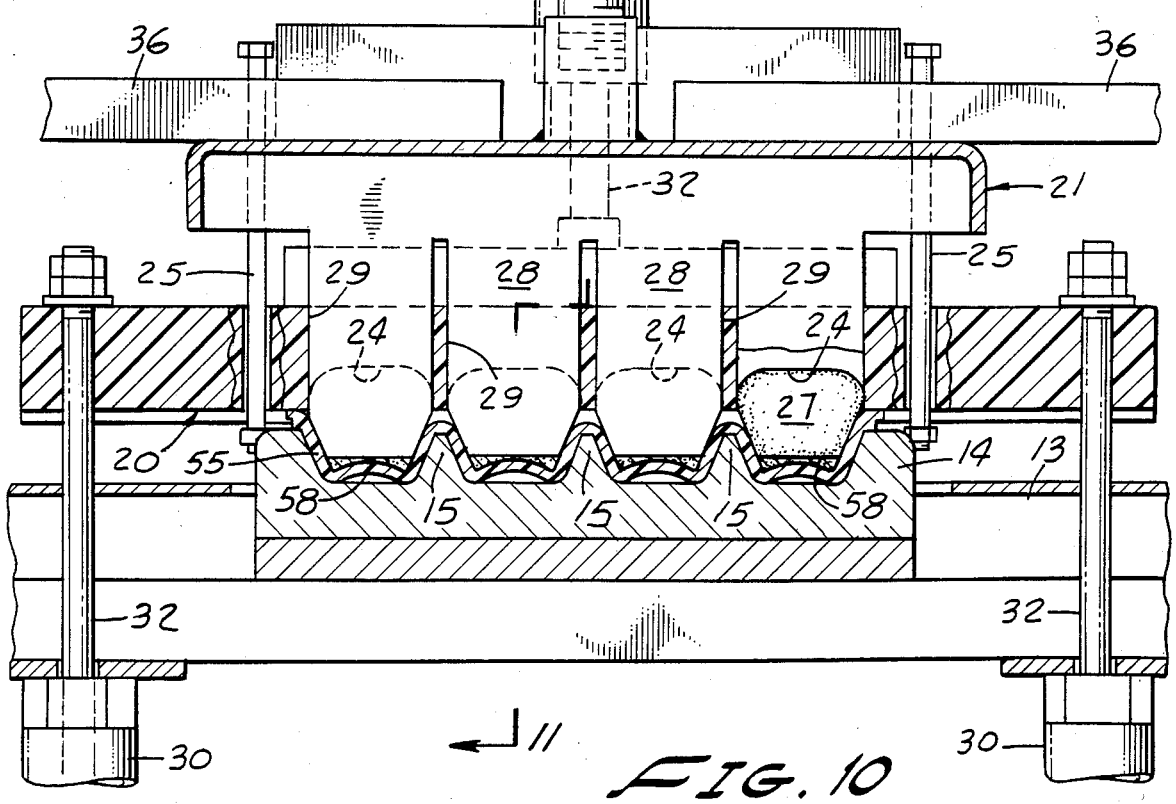
FIG. 10 is a cross-sectional view taken on line 11—11 on FIG. 10.
Figure 11:
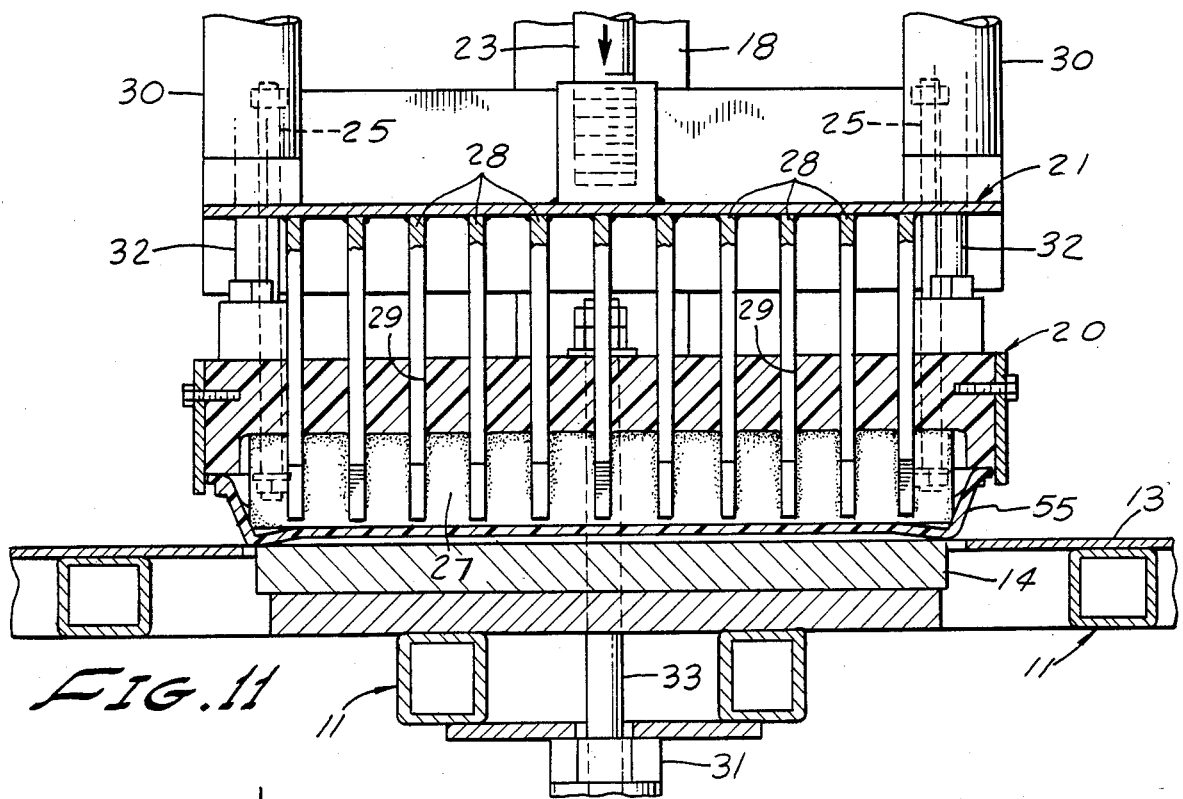
FIG. 11 is a cross-sectional view similar to FIG. 10, but showing the knife subassembly partially retracted.
Figure 12:
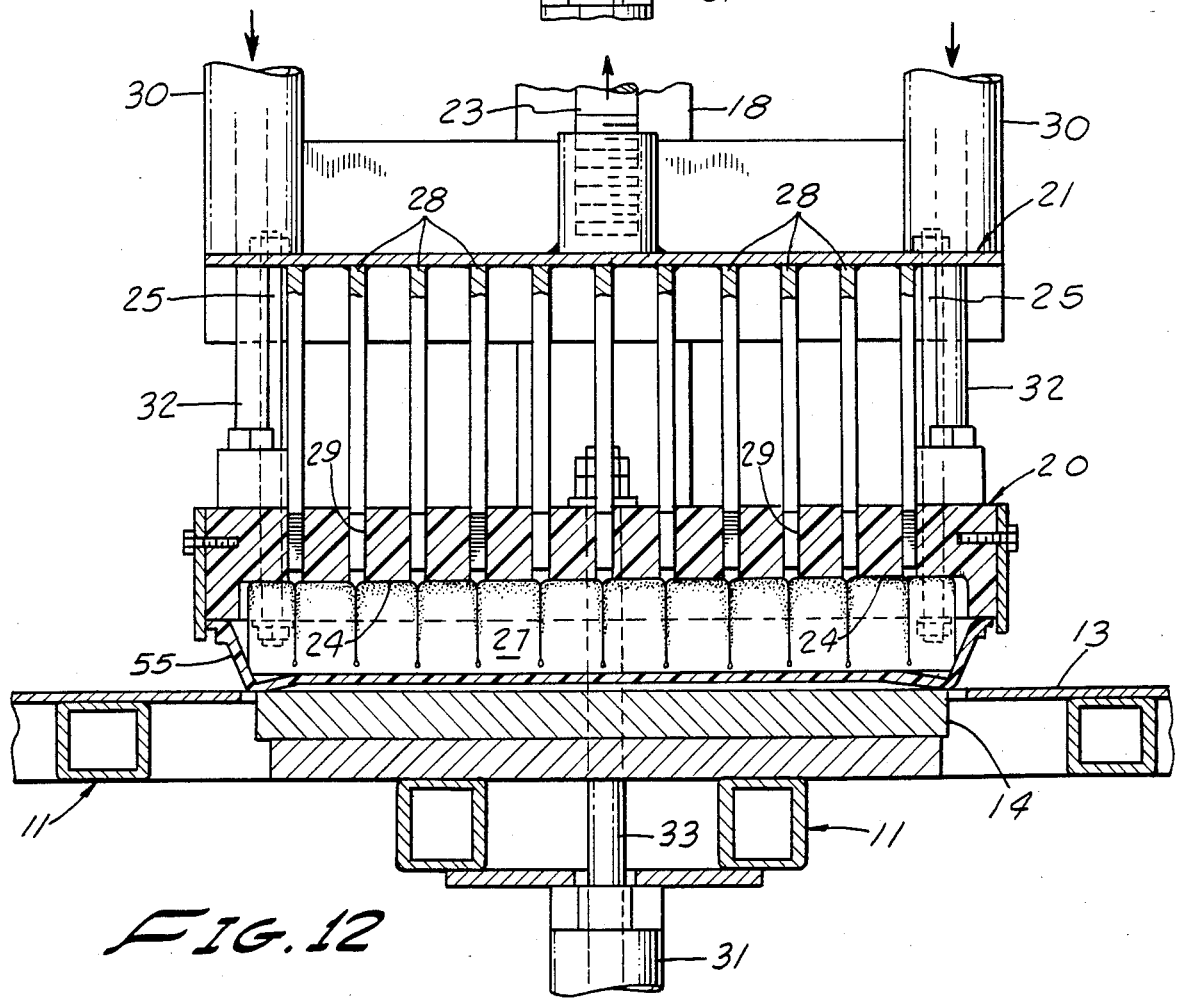
FIG. 12 is a view similar to FIG. 11, but showing the stripper assembly about to be retracted following withdrawal of the knife assembly from the dough.

As the piston of the main cylinder 22 moves downward, the blades 28 of divider 21 reciprocate downwardly through the slots 29 in stripper 20. The blades 28 continue downwardly into the dough thereby subdividing it into individual rolls as the blunt lowermost edges of the blades press the uppermost dough skin in contact therewith downwardly until it is virtually in contact with the dough skin on the underside of the loaf 27. In consequence a thin web of dough 58 (FIGS. 10 and 14) remains unsevered and weakly interconnecting each adjacent pair of dough units which webs remain intact until the dough is broken apart. After freezing and/or baking, these webs are fragile and readily broken. The underside of the stripper plate 20 overlying the loaves of dough 27 is formed with elongated concavities 24 (FIG. 7) which press against the tops of the loaves of dough 27. The lateral edges of these concavities overlie the rim edges of the tray and of the crests of the tray ribs separating the loaves. As blades 28 enter the dough, they cause each loaf to expand and fully occupy the space between concavities 24 and the associated channel of tray 55.

As the tray unloading cylinder 40 reaches its extended position to transfer a processed tray back onto the conveyor, its probe 46 engages limit switch LV-3 and sends a signal to port 3 of programmer 60 thereby transmitting an operating signal to the left hand end of valve V6 to supply air to the lower end of the main cylinder 22 to initiate withdrawl of dough divider 21. However, at this time air is still being supplied to cylinders 30 holding the pistons thereof extended to hold stripper 20 firmly in place against the tray while divider 21 is being retracted and until the divider blades 28 are elevated clear of the dough and approximately in the position illustrated in FIG. 9.

As the divider blades are being withdrawn, a previously processed tray of dough has been transferred back onto conveyor 12 and the piston of tray discharge cylinder 40 is being retracted. At the end of this return stroke a probe 46 mounted on its pusher 42 contacts limit valve LV-4 (FIGS. 1 and 16) and sends a signal to port 4 of programmer 60 with the result that a signal is transmitted to the pilot of valve V8 to open this valve and vent air to the atmosphere from cylinders 30 and 31 operatively associated with stripper 20. Accordingly these cylinders are no longer effective to hold the stripper down during the ongoing retraction of the piston of main cylinder 22. Thus, as is clearly shown in FIG. 9, further upward movement of divider 21 enables the several bolts 25 loosely interconnecting stripper 20 and divider 21 to lift stripper 20 to its fully retracted position shown in FIGS. 3, 7 and 8. Programmer 60 now automatically resets itself in condition for the next operating cycle which is initiated as the next tray of dough to be divided is manually placed against limit valve LV-1.

Additional features of the control system shown in FIG. 16 include a selector control switch SS1 appearing in the lower right hand corner of the schematic. This selector comprises a pair of normally open limit valves LV-7 and LV-8 having an operating handle manually pivotable to the right or to the left to transit an operating signal to valve V6. If this signal closes valve V6, air is supplied to cylinder 22 to lower stripper 20 and divider 21 whereas the operation of the selector SS1 to close valve V6 operates to restore the divider and the stripper to their retracted positions. Hence, selector SS1 is useful in conducting service and maintenance operations without need for the presence of trays of dough.

It should also be noted either of the valves V2 and V3 can be opened to interrupt operation of the apparatus at any point in an operating cycle. To facilitate interruption in the event of an emergency, these valves are typically located on the opposite sides of the apparatus.

Trays of subdivided dough in transit on conveyor 12 are frozen and stored in frozen condition until ready for baking at or near a consumption site. The trays of frozen dough are distributed to retail establishments or consumption sites in suitable refrigerated transport vehicles. When ready for baking, the wrapper is removed and the product is removed from the tray and is readily and quickly separated into individual rolls or other components by fracture of the frangible web 58 interconnecting adjacent rolls. The rolls are subsequently baked.

While the particular apparatus for automatically subdividing dough in a single use, nonmetallic tray herein shown and disclosed in detail is fully capable of attaining the objects and providing the advantages hereinbea dough subdividing assembly overlying said platen including a vertically reciprocable dough stripper comprising plate means provided with vertical slots extending transversely of a loaf of dough to be subdivided, and vertically reciprocable dough subdividing blades having a close sliding fit with a respective one of said slots, said stripper being operable to strip dough from said blades during the retraction of said blades from subdivided dough; and pneumatically powered automatic operating means for said dough subdividing assembly including control means therefor operable automatically when a tray of dough is positioned therebeneath on said platen to move said dough stripper substantially into loaf-confining contact with said tray adjacent the perimeter of said loaf followed by the extension and retraction of said dough subdividing blades to divide said loaf into a plurality of parts and for thereafter retracting said dough stripper away from said tray.

2. Apparatus as defined in claim 1 characterized in that said automatic control means includes pneumatically actuated control means for said dough subdividing assembly.

3. Apparatus as defined in claim 2 characterized in the provision of first pneumatic pusher means controlled by said control means and first sensor means operatively connected to said automatic control means and operable in response to the contact of a moving tray with said first sensor to actuate said pusher means to shift said tray onto said platen directly beneath said dough subdividing assembly.

4. Apparatus as defined in claim 3 characterized in that said first pneumatic pusher means is operable while advancing a tray of dough beneath said dough subdividing assembly to push a tray if then present beneath said dough subdividing assembly to a position therebeyond.

5. Apparatus as defined in claim 4 characterized in the provision of second pneumatic pusher means provided with sensor means operable when contacted by a tray exiting from beneath said dough subdividing assembly to transfer said tray away therefrom.

6. Apparatus as defined in claim 5 characterized in the provision of a power driven conveyor extending past said apparatus and operable to convey a tray of undivided dough to said apparatus and to receive a tray of divided dough returned to said conveyor by said second pusher means.

7. Apparatus as defined in claim 1 characterized in that said pneumatically powered operating means and said automatic control means therefor are operable through a single complete cycle in readiness for a new operating cycle when said first sensor is again contacted by a tray of undivided dough.

8. Apparatus as defined in claim 2 characterized in the provision of an enclosure overlying said platen and cooperating therewith to embrace said dough subdivid- 11. Apparatus as defined in claim 10 characterized in that said automatic control means includes means operatively associated with said door means and responsive to the open condition of said door means to disable said automatic control means so long as said door means remains open and to rearm said automatic control means when said door means is closed.

12. Apparatus as defined in claim 1 characterized in the provision of a tray formed of non-metallic material suitable as a packaging container for said loaf of dough after being subdivided and while being stored frozen.

13. Apparatus as defined in claim 1 characterized in the provision of a tray formed of inexpensive single use material suitable for providing a protective support for said loaf of dough after being subdivided and while being frozen, stored and transported.

14. Apparatus as defined in claim 1 characterized in the provision of a tray contoured to receive and support a plurality of separate spaced apart loaves of dough in side-by-side relation and each adapted to be subdivided by said dough subdividing assembly into similar portions while confined in said tray.

15. Apparatus as defined in claim 1 characterized in that said dough stripper is formed on the underside thereof with an elongated concave cavity positioned to overlie said loaf of dough and cooperating with said tray to confine said dough to said tray when lowered against the rim of a tray of dough therebeneath.

16. Apparatus as defined in claim 1 characterized in that said automatic control means for said power operated means for said dough subdividing assembly includes means for retracting said dough stripper and said dough subdividing assembly in the reverse order from the advance of each one thereof.

17. Apparatus as defined in claim 16 characterized in that said automatic control means for said power operated means for advancing and retracting said dough subdividing assembly includes means for maintaining said stripper fully advanced against said dough while said dough subdividing assembly is being retracted out of said dough.

18. Apparatus as defined in claim 1 characterized in that the close sliding fit between said dough subdividing blades and the slots of said dough stripper is substantially free of a lubricating medium.

19. Apparatus as defined in claim 1 characterized in that said dough subdividing blades are formed of stainless steel.

20. Apparatus as defined in claim 1 characterized in that said dough subdividing blades are made of a material substantially noncohesive to said dough.

21. Apparatus as defined in claim 1 characterized in that said dough stripper is formed primarily of ultra high molecular weight plastic material.

22. Apparatus as defined in claim 1 characterized in that the lower edge of the blades of said dough subdividing means lies generally normal to the faces of said blades.

23. Apparatus as defined in claim 1 characterized in the provision of stop means to limit the lowering of the blades of said dough subdividing assembly to a level spaced slightly above the underlying interior bottom surface of said tray thereby to avoid complete separation of the dough to either side of said blade and with the lower edge of said blade sufficiently close to the bottom of said tray to leave the portions of dough to either lateral face of the blade connected by a thin web of dough.

24. Apparatus as defined in claim 1 characterized in the provision of stop means positioned to limit the downward movement of said stripper relative to said tray and said loaf of dough, and said tray being so proportioned relative to the overlying surface of said dough stripper that said loaf of dough is substantially fully confined and under slight compression when said stripper and said subdividing assembly are fully advanced.

25. Apparatus as defined in claim 1 characterized in the provision of a tray having an inverted V-shaped ridge formed lengthwise of the bottom thereof dividing the space to either side thereof into a pair of similar cells each adapted to receive a loaf of dough; and said platen having an upstanding rib thereon positioned and sized to cooperate with the underside of said V-shaped ridge to pilot the tray into a proper position for the subdivision of said dough by said dough subdividing assembly.

26. Apparatus as defined in claim 1 characterized in the provision of means for limiting the advance of said blades to a position spaced slightly above the underlying surface of said tray thereby to avoid the risk of damage to said tray.

27. Apparatus as defined in claim 26 characterized in the provision of a tray formed of molded plastic bead material.

28. Apparatus as defined in claim 1 characterized in the provision of means for limiting the advance of said blades sufficiently above the underlying surface of said tray as to leave the portions of dough to either side of each of said blades interconnected by a thin web of dough.

29. Apparatus as defined in claim 1 characterized in the provision of means for limiting the advance of said blades with the lowermost edge thereof spaced sufficiently above the juxtaposed bottom surface of said tray as to leave the portions of dough to either side of each of said blades interconnected by a thin web of dough composed in major part by upper and lower portions of skin dough.

* * * * *